(12) United States Patent
Thioux et al.

(10) Patent No.: US 9,104,867 B1
(45) Date of Patent: Aug. 11, 2015

(54) MALICIOUS CONTENT ANALYSIS USING SIMULATED USER INTERACTION WITHOUT USER INVOLVEMENT

(71) Applicants: Emmanuel Thioux, Milpitas, CA (US); Muhammad Amin, Milpitas, CA (US); Darien Kindlund, Milpitas, CA (US); Alex Pilipenko, Milpitas, CA (US); Michael Vincent, Milpitas, CA (US)

(72) Inventors: Emmanuel Thioux, Milpitas, CA (US); Muhammad Amin, Milpitas, CA (US); Darien Kindlund, Milpitas, CA (US); Alex Pilipenko, Milpitas, CA (US); Michael Vincent, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 13 days.

(21) Appl. No.: 13/801,532

(22) Filed: Mar. 13, 2013

(51) Int. Cl.
G06F 21/56 (2013.01)

(52) U.S. Cl.
CPC ...................................... *G06F 21/56* (2013.01)

(58) Field of Classification Search
CPC .... H04L 63/1491; G06F 21/566; G06F 21/56
USPC .......................................................... 726/24
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A * | 8/2000 | Boulay et al. | .............. 714/38.13 |
| 6,269,330 B1 | 7/2001 | Cidon et al. | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |

(Continued)

FOREIGN PATENT DOCUMENTS

| | | |
|---|---|---|
| GB | 2439806 | 1/2008 |
| WO | WO-02/06928 | 1/2002 |

(Continued)

OTHER PUBLICATIONS

*IEEE Xplore Digital Library Sear Results for "detection of unknown computer worms"*. Http://ieeexplore.ieee.org/searchresult.jsp?SortField=Score&SortOrder=desc&ResultC . . . , (Accessed on Aug. 28, 2009).

(Continued)

*Primary Examiner* — Joseph P Hirl
*Assistant Examiner* — J. Brant Murphy
(74) *Attorney, Agent, or Firm* — Rutan & Tucker LLP; William W. Schaal

(57) ABSTRACT

Techniques for detecting malicious content using simulated user interactions are described herein. In one embodiment, a monitoring module monitors activities of a malicious content suspect executed within a sandboxed operating environment. In response to detection of a predetermined event triggered by the malicious content suspect requesting a user action on a graphical user interface (GUI) presented by the malicious content suspect, simulating, a user interaction module simulates a user interaction with the GUI without user intervention. An analysis module analyzes activities of the malicious content suspect in response to the simulated user interaction to determine whether the malicious content suspect should be declared as malicious.

44 Claims, 7 Drawing Sheets

(56) References Cited

U.S. PATENT DOCUMENTS

| | | | |
|---|---|---|---|
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,328,453 B2 * | 2/2008 | Merkle et al. | 726/23 |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,849,506 B1 | 12/2010 | Dansey et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Bennett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,201,246 B1 | 6/2012 | Wu et al. | |
| 8,204,984 B1 | 6/2012 | Aziz et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,709 B2 | 7/2012 | Viljoen et al. | |
| 8,239,944 B1 | 8/2012 | Nachenberg et al. | |
| 8,266,091 B1 * | 9/2012 | Gubin et al. | 706/52 |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,365,286 B2 | 1/2013 | Poston | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,510,827 B1 | 8/2013 | Leake et al. | |
| 8,510,842 B2 | 8/2013 | Amit et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,946 B1 | 10/2013 | Aziz et al. | |
| 8,584,094 B2 | 11/2013 | Dahdia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,713,681 B2 | 4/2014 | Silberman et al. | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1 | 10/2002 | Tang | |
| 2002/0166063 A1 | 11/2002 | Lachman et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron et al. | |
| 2003/0200460 A1 | 10/2003 | Morota et al. | |
| 2003/0212902 A1 | 11/2003 | Van Der Made | |
| 2003/0229801 A1 * | 12/2003 | Kouznetsov et al. | 713/200 |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0093513 A1 | 5/2004 | Cantrell et al. | |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0255161 A1 | 12/2004 | Cavanaugh | |
| 2004/0268147 A1 | 12/2004 | Wiederin et al. | |
| 2005/0021740 A1 | 1/2005 | Bar et al. | |
| 2005/0033960 A1 | 2/2005 | Vialen et al. | |
| 2005/0033989 A1 | 2/2005 | Poletto et al. | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0114663 A1 | 5/2005 | Cornell et al. | |
| 2005/0125195 A1 | 6/2005 | Brendel | |
| 2005/0157662 A1 | 7/2005 | Bingham et al. | |
| 2005/0183143 A1 | 8/2005 | Anderholm et al. | |

(56) References Cited

U.S. PATENT DOCUMENTS

| | | |
|---|---|---|
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021029 A1* | 1/2006 | Brickell et al. .................. 726/22 |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0089165 A1 | 4/2007 | Wei et al. |
| 2007/0094730 A1 | 4/2007 | Bhikkaji et al. |
| 2007/0101435 A1* | 5/2007 | Konanka et al. .................. 726/27 |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1* | 7/2007 | Gribble et al. .................. 726/24 |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2007/0285578 A1 | 12/2007 | Hirayama et al. |
| 2008/0005782 A1* | 1/2008 | Aziz .................. 726/3 |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1* | 6/2009 | Lamastra et al. ................ 726/22 |
| 2009/0158430 A1 | 6/2009 | Borders |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1* | 7/2010 | Ismael et al. .................... 726/22 |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145920 A1 | 6/2011 | Mahaffey et al. |
| 2011/0167494 A1* | 7/2011 | Bowen et al. .................... 726/24 |
| 2011/0247072 A1 | 10/2011 | Staniford et al. |
| 2011/0265182 A1 | 10/2011 | Peinado et al. |
| 2011/0296487 A1* | 12/2011 | Walsh .............................. 726/1 |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1* | 1/2013 | Gribble et al. ................... 726/24 |
| 2013/0036472 A1 | 2/2013 | Aziz |
| 2013/0047257 A1 | 2/2013 | Aziz |
| 2013/0097706 A1 | 4/2013 | Titonis et al. |
| 2013/0139264 A1* | 5/2013 | Brinkley et al. ................ 726/24 |
| 2013/0160130 A1 | 6/2013 | Mendelev et al. |
| 2013/0160131 A1 | 6/2013 | Madou et al. |

(56) References Cited

U.S. PATENT DOCUMENTS

| | | |
|---|---|---|
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0333032 A1 | 12/2013 | Delatorre et al. |
| 2014/0053260 A1 | 2/2014 | Gupta et al. |
| 2014/0053261 A1 | 2/2014 | Gupta et al. |

FOREIGN PATENT DOCUMENTS

| | | |
|---|---|---|
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | WO-2012145066 | 10/2012 |

OTHER PUBLICATIONS

*AltaVista Advanced Search Results. "Event Orchestrator".* Http://www.altavista.com/web/results?Itag=ody&pg=aq&aqmode=aqa=Event+Orchesrator . . . , (Accessed on Sep. 3, 2009).
*AltaVista Advanced Search Results. "attack vector identifier".* Http://www.altavista.com/web/results?Itag=ody&pg=aq&aqmode=aqa=Event+Orchestrator . . . , (Accessed on Sep. 15, 2009).
*Cisco, Configuring the Catalyst Switched Port Analyzer (SPAN)* ("*Cisco*"), (1992-2003).
Reiner Sailer, Enriquillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer").
*Excerpt regarding First Printing Date for Merike Kaeo, Designing Network Security* ("*Kaeo*"), (2005).
*The Sniffers's Guide to Raw Traffic* available at: yuba.stanford.edu/~casado/pcap/section1.html, (Jan. 6, 2014).
"Network Security: NetDetector—Network Intrusion Forensic System (NIFS) Whitepaper", ("*NetDetector Whitepaper*"), (2003).
"Packet", *Microsoft Computer Dictionary, Microsoft Press,* (Mar. 2002), 1 page.
"When Virtual is Better Than Real", *IEEEXplore Digital Library,* available at, http://ieeexplore.ieee.org/xpl/articleDetails.jsp?reload=true&arnumber=990073, (Dec. 7, 2013).
Abdullah, et al., *Visualizing Network Data for Intrusion Detection, 2005 IEEE Workshop on Information Assurance and Security,* pp. 100-108.
Adetoye, Adedayo , et al., "Network Intrusion Detection & Response System", ("*Adetoye*"), (Sep. 2003).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", *Springer-verlag Berlin Heidelberg,* (2006), pp. 165-184.
Bayer, et al., "Dynamic Analysis of Malicious Code", *J Comput Virol,* Springer-Verlag, France., (2006), pp. 67-77.
Boubalos, Chris , "extracting syslog data out of available at raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology,* CoNEXT '05, Toulousse, France, (Oct. 2005), pp. 71-82.
Cohen, M.I. , "PyFlag—An advanced network forensic framework", *Digital investigation 5,* Elsevier, (2008), pp. S112-S120.
Costa, M. , et al., "Vigilante: End-to-End Containment of Internet Worms", *SOSP '05, Association for Computing Machinery, Inc.,* Brighton U.K., (Oct. 23-26, 2005).
Crandall, J.R. , et al., "Minos:Control Data Attack Prevention Orthogonal to Memory Model", *37th International Symposium on Microarchitecture,* Portland, Oregon, (Dec. 2004).
Deutsch, P. , "Zlib compressed data format specification version 3.3" RFC 1950, (1996).
Distler, "Malware Analysis: An Introduction", *SANS Institute InfoSec Reading Room,* SANS Institute, (2007).
Dunlap, George W., et al., "ReVirt: Enabling Intrusion Analysis through Virtual-Machine Logging and Replay", *Proceeding of the 5th Symposium on Operating Systems Design and Implementation, USENIX Association,* ("Dunlap"), (Dec. 9, 2002).
Filiol, Eric , et al., "Combinatorial Optimisation of Worm Propagation on an Unknown Network", International Journal of Computer Science 2.2 (2007).
Goel, et al., *Reconstructing System State for Intrusion Analysis,* Apr. 2008 *SIGOPS Operating Systems Review,* vol. 42 Issue 3, pp. 21-28.
Hjelmvik, Erik , "Passive Network Security Analysis with NetworkMiner", (*In*)*Secure,* Issue 18, (Oct. 2008), pp. 1-100.
Kaeo, Merike , "Designing Network Security", ("*Kaeo*"), (Nov. 2003).
Kim, H. , et al., "Autograph: Toward Automated, Distributed Worm Signature Detection", *Proceedings of the 13th Usenix Security Symposium (Security* 2004), San Diego, (Aug. 2004), pp. 271-286.
King, Samuel T., et al., "Operating System Support for Virtual Machines", ("*King*").
Krasnyansky, Max , et al., *Universal TUN/TAP driver,* available at https://www.kernel.org/doc/Documentation/networking/tuntap.txt (2002) ("Krasnyansky").
Kreibich, C. , et al., "Honeycomb-Creating Intrusion Detection Signatures Using Honeypots", *2nd Workshop on Hot Topics in Networks (HotNets-11),* Boston, USA, (2003).
Kristoff, J. , "Botnets, Detection and Mitigation: DNS-Based Techniques", *NU Security Day,* (2005), 23 pages.
Liljenstam, Michael , et al., "Simulating Realistic Network Traffic for Worm Warning System Design and Testing", *Institute for Security Technology studies, Dartmouth College,* ("Liljenstam"), (Oct. 27, 2003).
Marchette, David J., "Computer Intrusion Detection and Network Monitoring: A Statistical Viewpoint", "*Marchette*", (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", *INFOCOM,* vol. 3, (Mar. 30-Apr. 3, 2003), pp. 1901-1910.
Morales, Jose A., et al., ""Analyzing and exploiting network behaviors of malware."", *Security and Privacy in Communication Networks. Springer Berlin Heidelberg,* 2010. 20-34.
Natvig, Kurt , "SANDBOXII: Internet", *Virus Bulletin Conference,* ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", *In Proceedings of the 12th Annual Network and Distributed System Security, Symposium (NDSS '05),* (Feb. 2005).
Newsome, J. , et al., "Polygraph: Automatically Generating Signatures for Polymorphic Worms", *In Proceedings of the IEEE Symposium on Security and Privacy,* (May 2005).
Nojiri, D. , et al., "Cooperation Response Strategies for Large Scale Attack Mitigation", *DARPA Information Survivability Conference and Exposition,* vol. 1, (Apr. 22-24, 2003), pp. 293-302.
Peter M. Chen, and Brian D. Noble , "When Virtual is Better Than Real, Department of Electrical Engineering and Computer Science", *University of Michigan* ("*Chen*").
Silicon Defense, "Worm Containment in the Internal Network", (Mar. 2003), pp. 1-25.
Singh, S. , et al., "Automated Worm Fingerprinting", *Proceedings of the ACM/USENIX Symposium on Operating System Design and Implementation,* San Francisco, California, (Dec. 2004).

(56) References Cited

OTHER PUBLICATIONS

Spitzner, Lance, "Honeypots: Tracking Hackers", (*"Spizner"*), (Sep. 17, 2002).

Thomas H. Ptacek, and Timothy N. Newsham, "Insertion, Evasion, and Denial of Service: Eluding Network Intrusion Detection", *Secure Networks*, ("Ptacek") (Jan. 1998).

Venezia, Paul, "NetDetector Captures Intrusions", *InfoWorld Issue 27*, ("Venezia"), (Jul. 14, 2003).

Whyte, et al., "DNS-Based Detection of Scanning Works in an Enterprise Network", *Proceedings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las Vegas, NV, USA, (Dec. 2002), pp. 1-9.

U.S. Appl. No. 13/801,532, Non Final Office Action, mailed Feb. 20, 2015.

U.S. Appl. No. 13/828,785, Non Final Office Action, mailed Mar. 25, 2015.

* cited by examiner

MALICIOUS CONTENT ANALYSIS USING SIMULATED USER INTERACTION WITHOUT USER INVOLVEMENT

FIELD OF THE INVENTION

Embodiments of the present invention relate generally to malicious content detection. More particularly, embodiments of the invention relate to performing a malicious content analysis using simulated user interaction on a malicious content suspect without user involvement.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to a hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

Some malware may involve user interaction before performing an unauthorized action that may cause damages. For example, malware may display a graphical user interface (GUI) such as a dialog box requesting a user to interact with the GUI. Once the user clicks on a button of the GUI, the malware then performs an unauthorized action. In another example, malware may display a dialog box and only performs the unauthorized action when a user closes or terminates the dialog box. Thus, in order to perform a malware detection analysis, a user or an administrator has to manually interact with the GUI presented by the malware during the execution of the malware. For a malware detection system that performs thousands of analysis, such a requirement of user interactions is unacceptable and inefficient.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for detecting malware using simulated user interactions are described herein. According to some embodiments, a user interaction simulation mechanism is utilized by a malicious content detection system to simulate user interactions with a GUI presented by a malicious content suspect during a detection of malicious content without requiring an actual user be involved, such that the detection process can be automated without interruption. According to one embodiment, a malicious content suspect may be executed within an automated environment. When a GUI such as a dialog box is presented by the malicious content suspect, the malicious content detection system invokes the automated environment to simulate a user action performed on the GUI such as an activation of an OK button or a CLOSE button, such that the detection process can continue without user interaction. According to another embodiment, the malicious content detection system hooks onto certain GUI application programming interfaces (APIs) of an operating system such that when the malicious content suspect presents a GUI page, the malicious content detection system can receive a notification from the operating system and intercept the communication between the GUI and the operating system to manipulate a user interaction with the GUI such as an activation of an OK button or a CLOSE button without involving an actual user. As a result, the malicious content detection process can be performed automatically without interruption.

Figure 1:
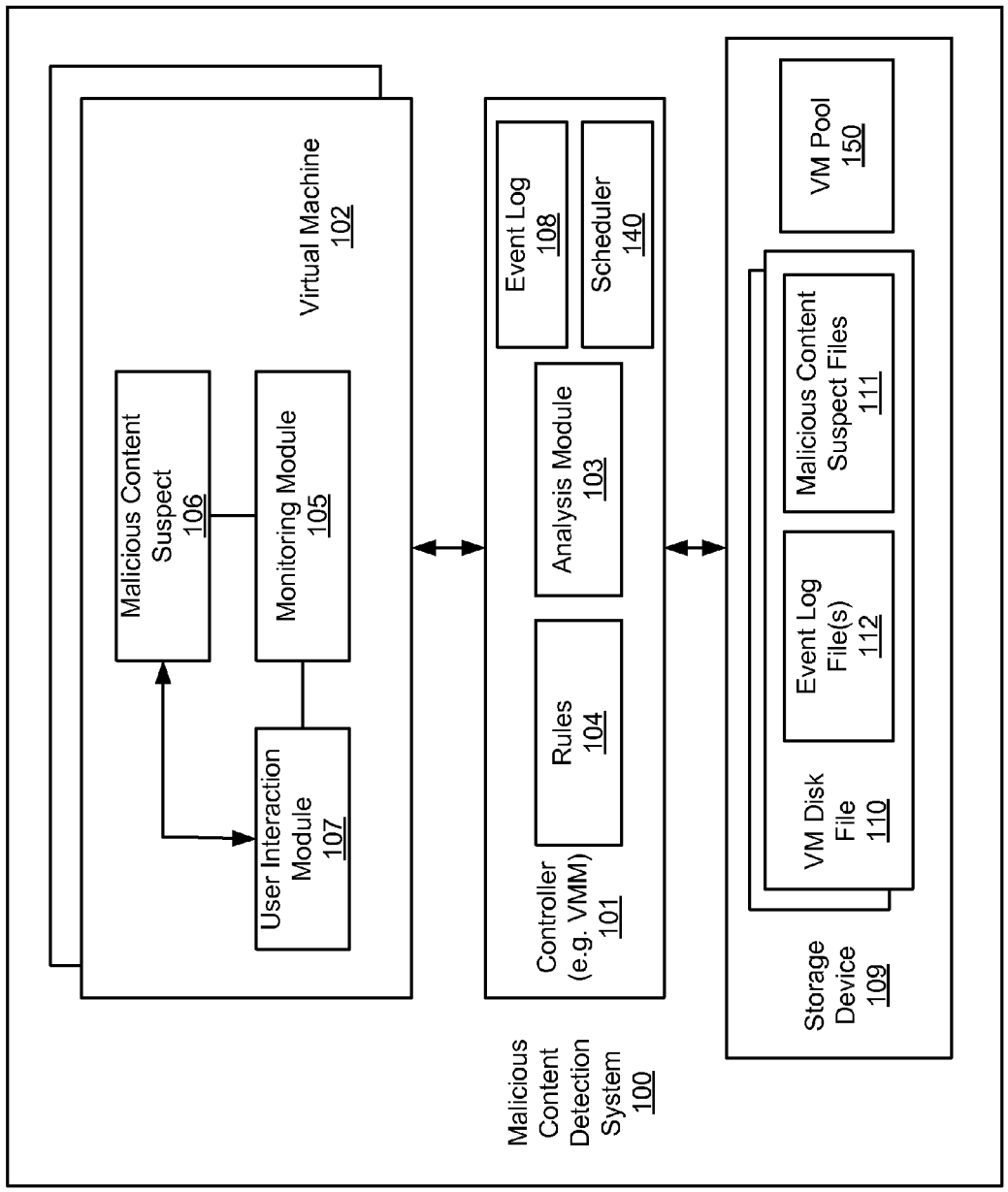
FIG. 1 is a block diagram illustrating a malicious content detection system according to one embodiment of the invention.

FIG. 1 is a block diagram illustrating a malicious content detection system according to one embodiment of the invention. Referring to FIG. 1, system 100 includes controller 101 to manage or control one or more virtual machines (VMs) (also referred to as a sandboxed operating environment or simply a sandbox), where content associated with the VMs are stored in storage device 109 in a form of VM disk files.

Controller 101 may be implemented as part of a VM monitor or manager (VMM), also referred to as a hypervisor for managing or monitoring VMs, which may be hosted by a host operating system (OS). VM 102 may be hosted by a guest OS. The host OS and the guest OS may be the same type of operating systems or different types of operating systems (e.g., Windows™, Linux™, Unix™, Mac OS™, iOS™, etc.), or different versions thereof. A VM is a simulation of a machine (abstract or real) that is usually different from the target machine (where it is being simulated on). Virtual machines may be based on the specifications of a hypothetical computer or emulate the computer architecture and functions of a real world computer. A virtual machine referred to herein can be any type of virtual machine, such as, for example, hardware emulation, full virtualization, para-virtualization, and operating system-level virtualization virtual machines.

According to one embodiment, when malicious content suspect 106 is received for dynamic analysis, scheduler 140 of controller 101 is configured to identify and select a VM, in this example VM 102, from VM pool 150 having various VMs that have been configured to closely simulate various target operating environments (e.g., particular version of an OS with particular versions of certain software applications installed therein) in which malicious content suspect 106 is to be analyzed. VM pool 150 may be configured in the corresponding VM profiles. Scheduler 140 then launches VM 102 in which monitoring module 105 is running within the VM and configured to monitor activities and behavior of malicious content suspect 106.

In addition, monitoring module 105 maintains a persistent communication channel with analysis module 103 of controller 101 to communicate certain events or activities of malicious content suspect 106 during the execution. In response to detecting certain predetermined events triggered by malicious content suspect 106, monitoring module 105 is configured to send a message via the communication channel to analysis module 103, where the message may be recorded as part of event log 108. The message includes information identifying an event triggered by malicious content suspect 106. Event log 108 records events that have been selectively monitored and detected by monitoring module 103, such as, for example, GUI events that require a user intervention. Content of the event log 108 may be stored in a persistent storage as part of event log file(s) 112 of VM disk file 110 associated with VM 102. The recorded events may be analyzed by analysis module 103 based on a set of rules 104 to determine whether malicious content suspect 106 is indeed malicious or should be declared or considered with high probability of malicious.

In one embodiment, in response to certain GUI events such as displaying a GUI dialog box, monitoring module 105 invokes user interface module 107 to simulate a user interaction with the GUI events without requiring an actual user be involved. For example, if a dialog box is displayed and prompts a user for a confirmation by clicking an OK button, user interface module 107 is configured to send a command simulating an activation of the OK button presented by the dialog box, such that the execution of malicious content suspect can continue without having to wait for user interaction from a user. Thereafter, monitoring module 105 monitors the behavior of malicious content suspect after the simulated user interaction with the GUI and communicates any suspicious behavior to controller 101 via the communication channel.

Figure 2:
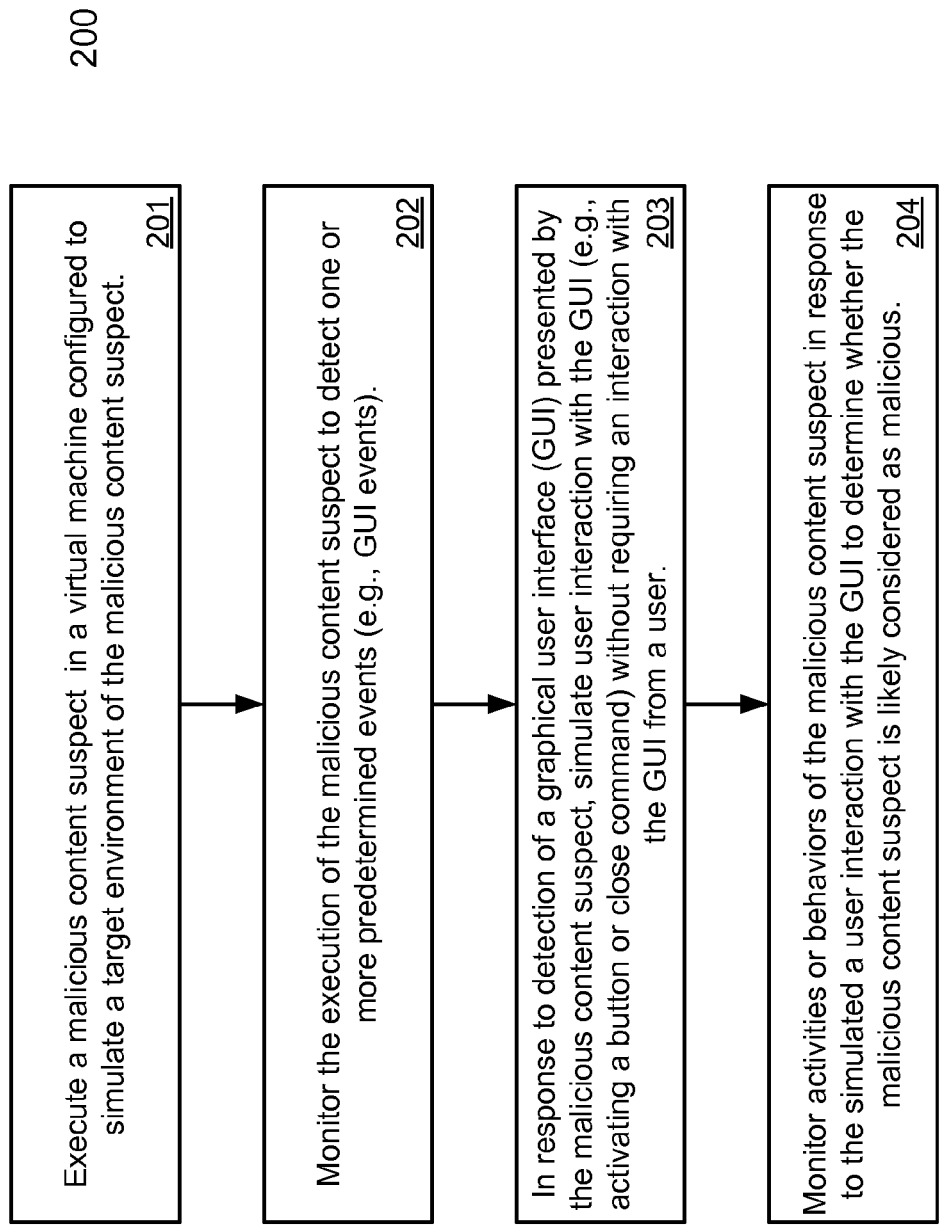
FIG. 2 is a flow diagram illustrating a method for detecting malicious content according to one embodiment of the invention.

FIG. 2 is a flow diagram illustrating a method for detecting malicious content according to one embodiment of the invention. Method 200 may be performed by malicious content detection system 100 of FIG. 1, which may be implemented in software, hardware, or a combination thereof. Referring to FIG. 2, at block 201, processing logic executes a malicious content suspect in a VM configured to simulate a target operating environment of the malicious content suspect (e.g., preconfigured OS and software of certain versions). At block 202, processing logic monitors the behavior of the malicious content suspect during the execution to detect one or more predetermined events (e.g., GUI events). In response to detection of a GUI event triggered by the malicious content suspect, at block 203, processing logic automatically simulates a user interaction (e.g., activation of an OK or CLOSE button)

with the GUI presented by the malicious content suspect without requiring an interaction with the GUI from a user. At block 204, processing logic monitors the behavior of the malicious content suspect in response to the simulated user interaction to determine whether the malicious content suspect is indeed malicious or should be declared or considered with high probability of malicious.

Figure 3:
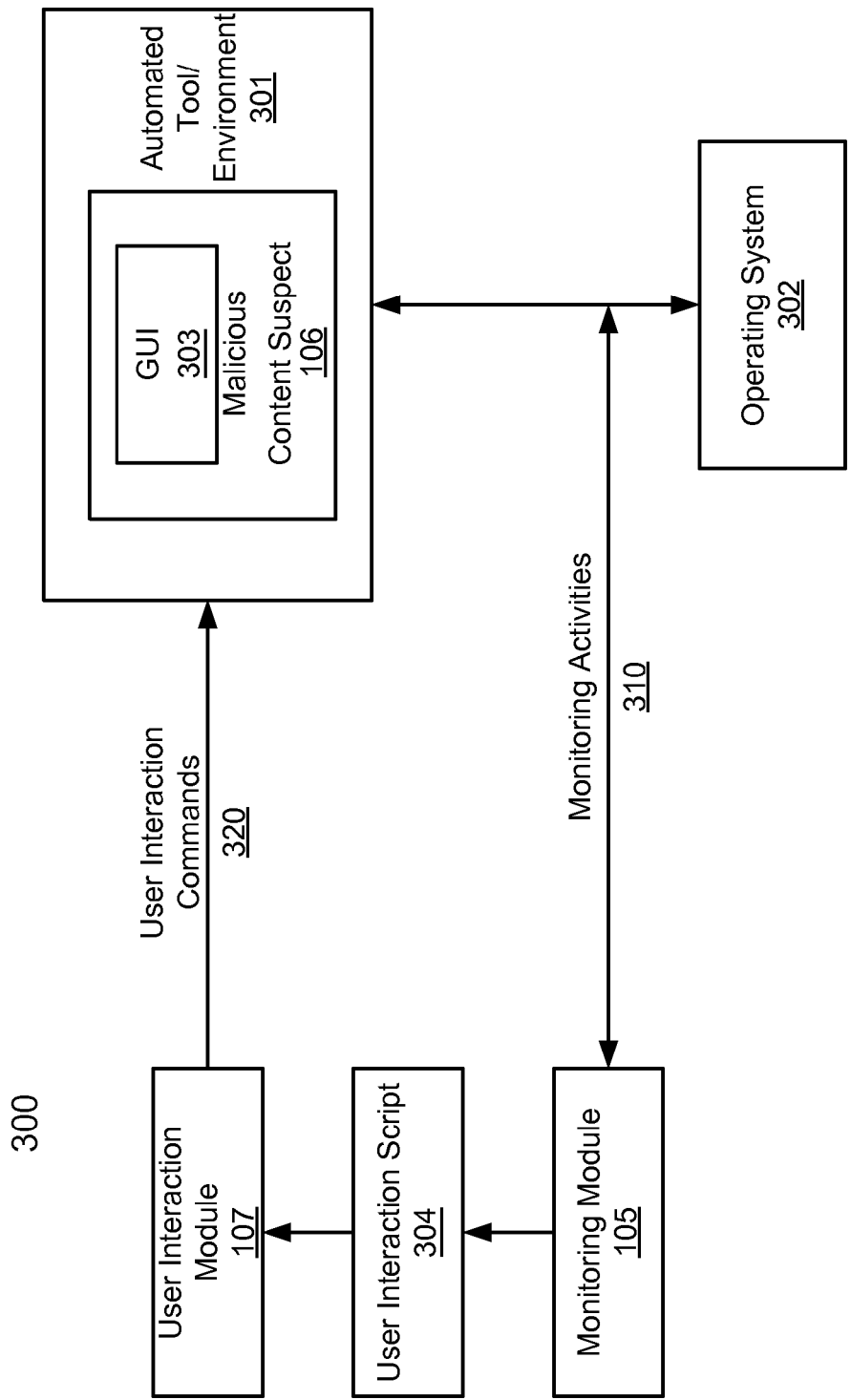
FIG. 3 is a block diagram illustrating a mechanism for simulating a user interaction according to one embodiment of the invention.

According to some embodiments, the user interaction simulation can be implemented using an automated operating environment or automated software or tool, such as, for example, a scripting automated environment or tool. FIG. 3 is a block diagram illustrating a mechanism for simulating a user interaction according to one embodiment of the invention. System 300 may be implemented as part of VM 102 of system 100 of FIG. 1. Referring to FIG. 3, in this example, malicious content suspect 106 is executed within a shell of automated environment 301, while the execution of the malicious content suspect 106 is monitored by monitoring module 105 via path 310 to detect any GUI events triggered between malicious content suspect 106 and operating system 302.

When monitoring module 105 detects a GUI event that malicious content suspect 106 presents GUI 303 that requires a user interaction, according to one embodiment, monitoring module 105 provides a user interaction script 304, which may be dynamically created dependent upon the specific GUI event. User interaction module 107 then executes script 304 and sends a user interaction comment 320 to automated environment 301 to allow the automated environment 301 to simulate a user interaction on GUI 303, without having to involve an actual user's action.

In one embodiment, automated environment 301 may be implemented using a scripting programming language for automating Microsoft Windows™ GUI. It uses a combination of simulated keystrokes, mouse movement, and window control manipulation to automate tasks. Script 304 may be dynamically created by monitoring module 105 or alternatively by analysis module 103 of controller 101 of FIG. 1 in response to a message received from monitoring module 105. Script 304 may be created in a batch file having scripting statements that are compatible with the scripting programming language.

For example, in the Windows™ operating environment, if malicious content suspect 106 is about to execute a file, in this example, FileX.exe, the batch file may contain the following statements:

copy source_directory\malware.exe temporary_directory\FileX.exe
  script_executor FILE temporary_directory\FileX.exe This batch will cause a file browser such as the Windows™ Explorer to open a new window with malware.exe selected. At that point, the script will send a {ENTER} command to simulate that a user pushed the [ENTER] key. In another embodiment, the script may wait for a predetermined period of time and try to find an active window for the malicious content. If it finds such a window, it will send a CLOSE message to it, simulating a user clicking the close button or menu, in order to suppress the display of the dialog box.

If malicious content suspect 106 is about to access a universal resource locator (URL), the batch file may contain the following statements:

batch_filename URL "c:\program files\ie\iexplore.exe" "http://www.suspicious URL.com"

With the file association, the Windows™ shell will launch the automated scripting environment or tool with the batch file as script to execute. When the script runs, it will check if the first parameter is [URL] or [FILE], in case of [URL] it will retrieve the second parameter and execute it (e.g., Internet browsers such as Internet Explorer™ (IE) or Firefox™) with the third parameter as an argument. Since the script knows from the filename what browser is in use, it will then wait for the proper dialog box to pop up.

According to another embodiment, instead of using an automated scripting environment, monitoring module 105 may register a hook to certain GUI events with the operating system, such that whenever malicious content suspect 106 triggers a GUI event such as displaying a dialog box, monitoring module 105 will receive a notification, such as a callback, from the operating system. As a result, monitoring module 105 can intercept the communications between malicious content suspect 106 and the operating system 302, and user interaction module 107 simulates the user interactions of the GUI without requiring an actual user. For example, user interaction module 107 may process the GUI calls from malicious content suspect 106, populates a response (e.g., a return data structure) that the operating system would have returned, and returns the response back to malicious content suspect 106. The malicious content suspect 106 is unaware that it is communicating with user interaction module 107; malicious content suspect 106 would still consider communicating with operating system 302.

Figure 4:
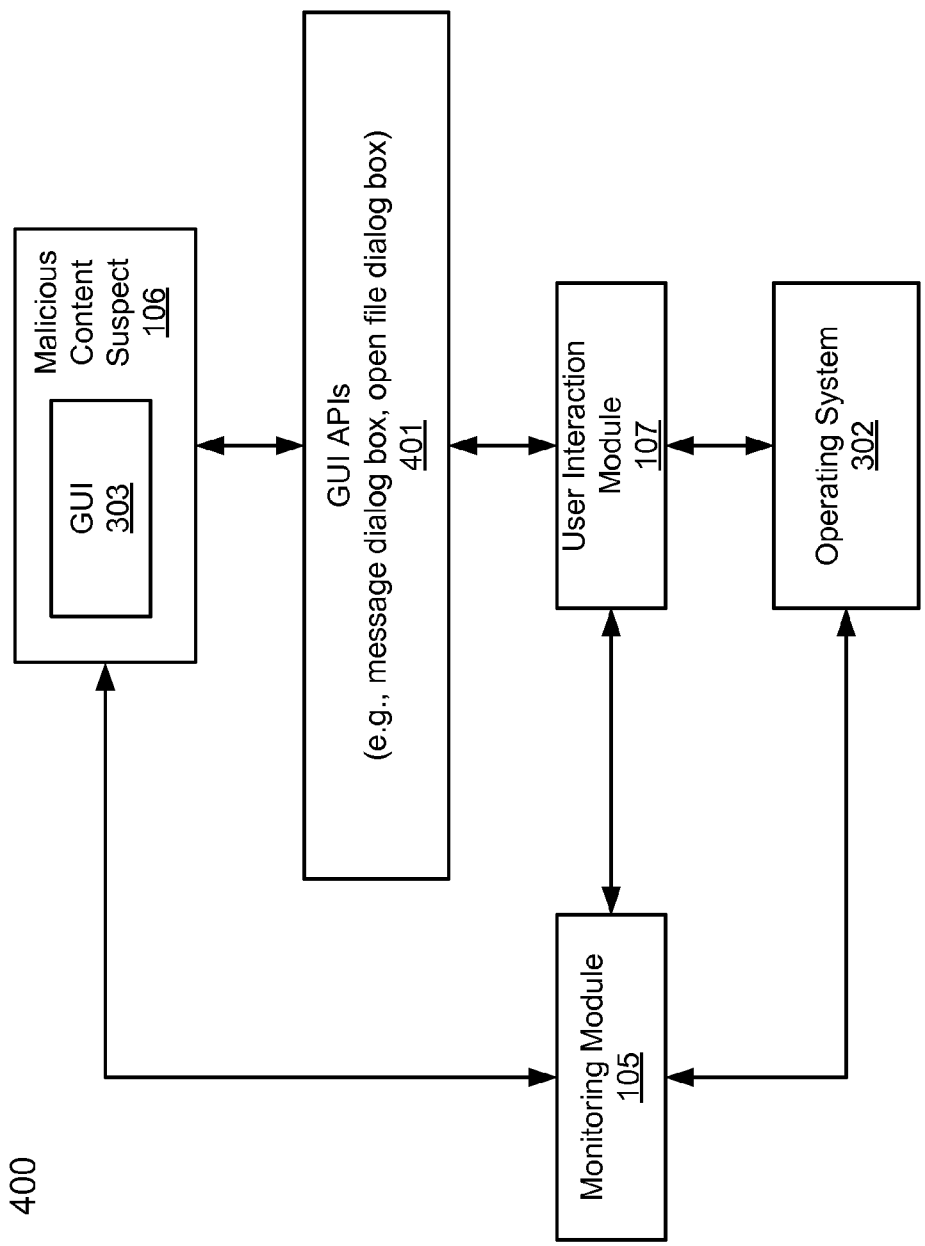
FIG. 4 is a block diagram illustrating a mechanism for simulating a user interaction according to another embodiment of the invention.

FIG. 4 is a block diagram illustrating a mechanism for simulating a user interaction according to another embodiment of the invention. Referring to FIG. 4, instead of using an automated scripting environment, user interface module 107 registers with operating system 302 with respect to certain GUI APIs 401 such that when malicious content suspect 306 attempts to display GUI 303 via GUI APIs 401, user interface module 107 intercepts such calls and manipulates user interactions with the GUI via the GUI APIs 401 without requiring an actual user involvement.

For example, in the Windows™ operating environment, user interaction module 107 may register a hook by calling SetWindowsHookEx( ) function with a callback function as a hook procedure via WH_CALLWNDPROC. When the operating system calls back due to certain GUI activities, the callback function can simulate the user interactions, such as, for example, by sending a message, such as SendMessage (WM_CLOSE), to a parent window, child control window, or calling a window function directly. Similar operations can be performed to simulate an OK button or opening a file, etc. The GUI APIs 401 for hooking may include MessageBoxA, MessageBoxExA, MessageBoxIndirectA, MessageBoxTimeoutA, MessageBoxW, MessageBoxExW, MessageBoxIndirectW, MessageBoxTimeoutW, GetOpenFileNameA, GetOpenFileNameW.

In one embodiment, the user interaction module 107 registers hooks to APIs such as CreateWindowExA and CreateWindowExW. When a new dialog box is about to be displayed, the registered hooks are called and the user interaction module 107 builds an internal data structure (e.g., template) that represents the contents and layout of the dialog box. After the dialog box has been created, it is compared to a library of dialogs that the system is trained to dismiss. The library contents may be written in a script language. Every library dialog template has a custom function that is used to close the corresponding dialog. After a matched dialog template is found, the dialog box is dismissed using associated library function. Note that other user interface buttons can also be applied herein. For example, a button can be either a predefined button on a system dialog (e.g., YES, NO, CANCEL, IGNORE, OK, TRY, RETRY, HELP, CONTINUE, and/or ABORT buttons or controls) or any button on a third party developed dialog.

Figure 5:
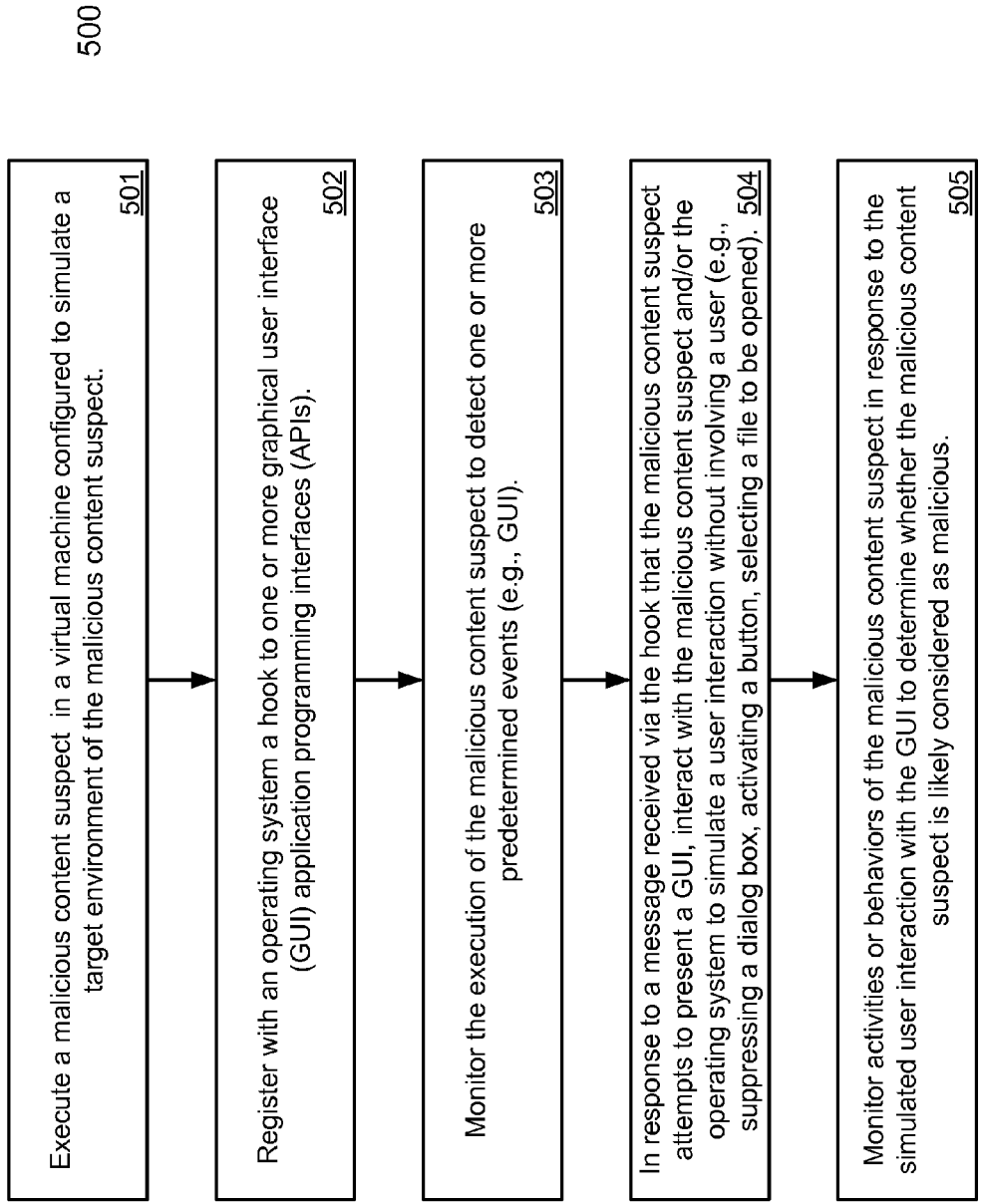
FIG. 5 is a flow diagram illustrating a method for simulating user interaction to detect malicious content according to one embodiment of the invention.

FIG. 5 is a flow diagram illustrating a method for simulating user interaction to detect malicious content according to one embodiment of the invention. Method 500 may be performed by system 400 of FIG. 4, which may be implemented as processing logic in software, hardware, or a combination thereof. Referring to FIG. 5, at block 501, processing logic executes a malicious content suspect in a VM that has been configured to simulate a target operating environment of the malicious content suspect. At block 502, processing logic registers with an operating system of the VM to hook to one or more GUI APIs. At block 503, processing logic monitors the execution of the malicious content suspect to detect one or more predetermined events such as GUI events. In response to a notification received from the operating system via the hook that the malicious content suspect attempts to present a GUI, at block 504, processing logic interacts with the malicious content suspect and/or the operating system to simulate a user interaction without involving a user, such as suppressing a dialog box, activating a button, selecting a file, etc. At block 505, processing logic monitors the behavior of the malicious content suspect in response to the simulated user interaction with the GUI to determine whether the malicious content suspect is indeed malicious or should be declared or considered with high probability of malicious.

Figure 6:
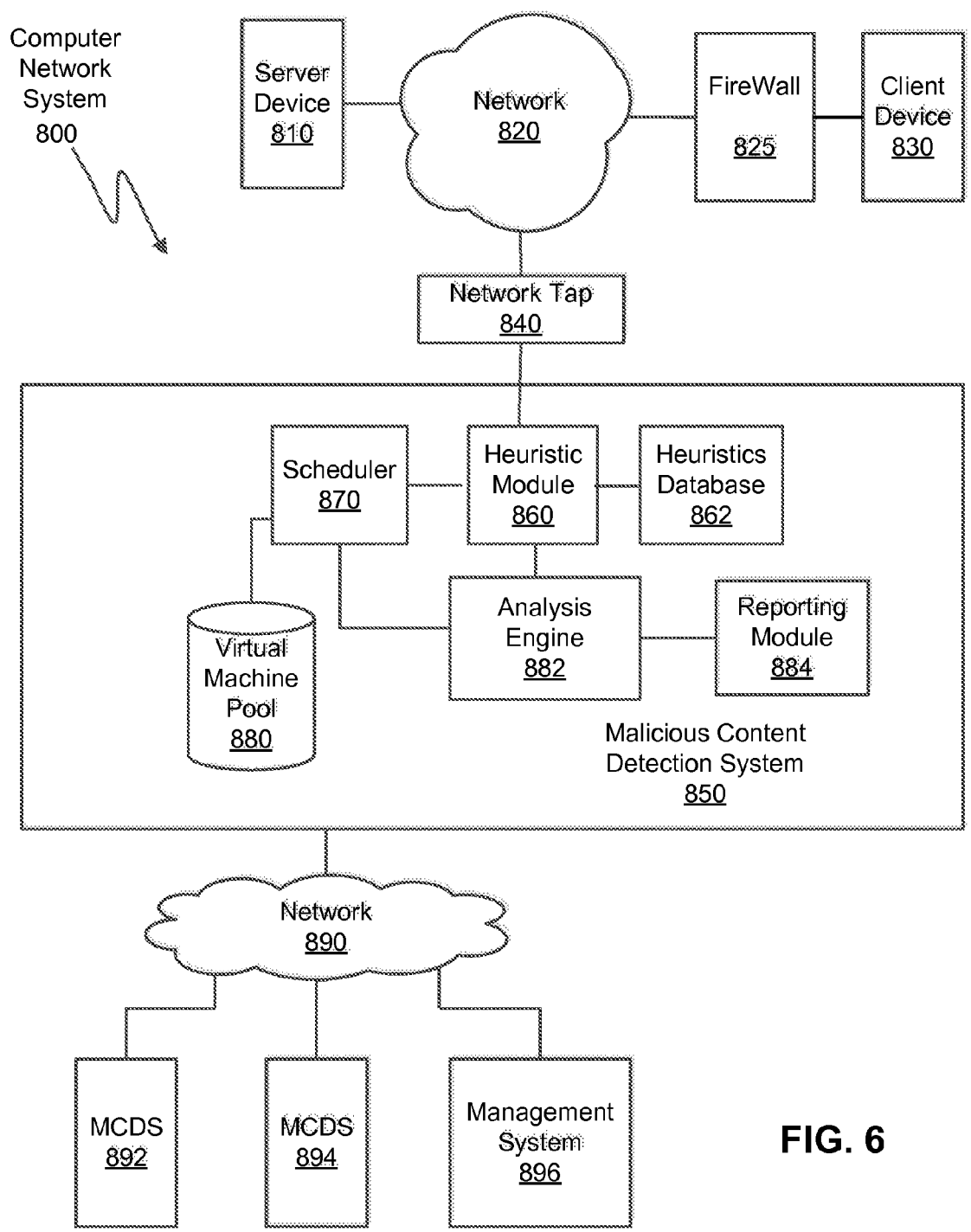
FIG. 6 is a block diagram of a computer network system deploying a malicious content detection system according to one embodiment of the invention.

FIG. 6 is a block diagram of an illustrative computer network system 800 having a malicious content detection system 850 in accordance with a further illustrative embodiment. The malicious content detection system 850 may represent any of the malicious content detection systems described above, such as, for example, detection system 100 of FIG. 1. The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 6 depicts data transmitted from the server device 810 to the client device 830, either device can transmit and receive data from the other.

Note that throughout this application, network content is utilized as an example of content for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), HyperText Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 825 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increase. Therefore, the malicious network content detection system 825 may not become a bottleneck in the computer network system 800.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 825 is shown as coupled with the network 820 by a network tap 840 (e.g., a data/packet capturing device). The network tap 840 may include a digital network tap configured to monitor network data and provide a copy of the network data to the malicious network content detection system 825. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as an dedicated appliance or a dedicated computer system, the network tap 840 may include an assembly integrated into the appliance or computer system that includes network ports, network interface card and related logic (not shown) for connecting to the communication network 860 to non-disruptively "tap" traffic thereon and provide a copy of the traffic to the heuristic module 850. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 815. In other embodiments, a heuristic module 860 (described herein) may determine the server device 810 and the client device 830 by analyzing data packets within the network data in order to generate the metadata. The term, "content," as used herein may be construed to include the intercepted network data and/or the metadata unless the context requires otherwise.

The malicious network content detection system 825 may include a heuristic module 860, a heuristics database 862, a scheduler 870, a virtual machine pool 880, an analysis engine 882 and a reporting module 884. In some embodiments, the network tap 840 may be contained within the malicious network content detection system 850.

The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. The heuristic module 860 may examine the image of the captured content without executing or opening the captured content. For example, the heuristic module 860 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 860 flags network data as suspicious after applying a heuristic analysis. This detection process is also referred to as a static malicious content detection. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 870 may then load and configure a virtual machine from the virtual machine pool 880 in an order related to the priority level, and dispatch the virtual machine to the analysis engine 882 to process the suspicious network content.

The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860. In another embodiment, the heuristic module 860 may provide identification information regarding the packet to the scheduler 870 such that the scheduler 870, replayer 805, or virtual machine may query the heuristic module 860 for data regarding the packet as needed.

The scheduler 870 may identify the client device 830 and retrieve a virtual machine associated with the client device 830. A virtual machine may itself be executable software that is configured to mimic the performance of a device (e.g., the client device 830). The virtual machine may be retrieved from the virtual machine pool 880. Furthermore, the scheduler 870 may identify, for example, a Web browser running on the client device 830, and retrieve a virtual machine associated with the web browser.

In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 850 may then transmit the features of the client device to the scheduler 870.

The virtual machine pool 880 may be configured to store one or more virtual machines. The virtual machine pool 880 may include software and/or a storage medium capable of storing software. In one example, the virtual machine pool 880 stores a single virtual machine that can be configured by the scheduler 870 to mimic the performance of any client device 830 on the communication network 820. The virtual machine pool 880 may store any number of distinct virtual machines that can be configured to simulate the performance of a wide variety of client devices 830.

The analysis engine 882 simulates the receipt and/or display of the network content from the server device 810 after the network content is received by the client device 110 to analyze the effects of the network content upon the client device 830. The analysis engine 882 may identify the effects of malware or malicious network content by analyzing the simulation of the effects of the network content upon the client device 830 that is carried out on the virtual machine. There may be multiple analysis engines 850 to simulate multiple streams of network content. The analysis engine 882 may be configured to monitor the virtual machine for indications that the suspicious network content is in fact malicious network content. Such indications may include unusual network transmissions, unusual changes in performance, and the like. This detection process is referred to as a dynamic malicious content detection.

The analysis engine 882 may flag the suspicious network content as malicious network content according to the observed behavior of the virtual machine. The reporting module 884 may issue alerts indicating the presence of malware, and using pointers and other reference information, identify the packets of the network content containing the malware. Additionally, the server device 810 may be added to a list of malicious network content providers, and future network transmissions originating from the server device 810 may be blocked from reaching their intended destinations, e.g., by firewall 825.

The computer network system 800 may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

Further information regarding an embodiment of a malicious content detection system can be had with reference to U.S. Pat. No. 8,171,553, the disclosure of which being incorporated herein by reference in its entirety.

As described above, the detection or analysis performed by the heuristic module 860 may be referred to as static detection or static analysis, which may generate a first score (e.g., a static detection score) according to a first scoring scheme or algorithm. The detection or analysis performed by the analysis engine 882 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious or should be declared or considered with high probability of malicious.

Furthermore, detection systems 850 and 892-894 may deployed in a variety of distribution ways. For example, detection system 850 may be deployed as a detection appliance at a client site to detect any suspicious content, for example, at a local area network (LAN) of the client. In addition, any of MCDS 892 and MCDS 894 may also be deployed as dedicated data analysis systems. Systems 850 and 892-894 may be configured and managed by a management system 896 over network 890, which may be a LAN, a wide area network (WAN) such as the Internet, or a combination of both. Management system 896 may be implemented as a Web server having a Web interface to allow an administrator of a client (e.g., corporation entity) to log in to manage detection systems 850 and 892-894. For example, an administrator may able to activate or deactivate certain functionalities of malicious content detection systems 850 and 892-894 or alternatively, to distribute software updates such as malicious content definition files (e.g., malicious signatures or patterns) or rules, etc. Furthermore, a user can submit via a Web interface suspicious content to be analyzed, for example, by dedicated data analysis systems 892-894. As described above, malicious content detection includes static detection and dynamic detection. Such static and dynamic detections can be distributed amongst different systems over a network. For example, static detection may be performed by detection system 850 at a client site, while dynamic detection of the same content can be offloaded to the cloud, for example, by any of detection systems 892-894. Other configurations may exist.

Figure 7:
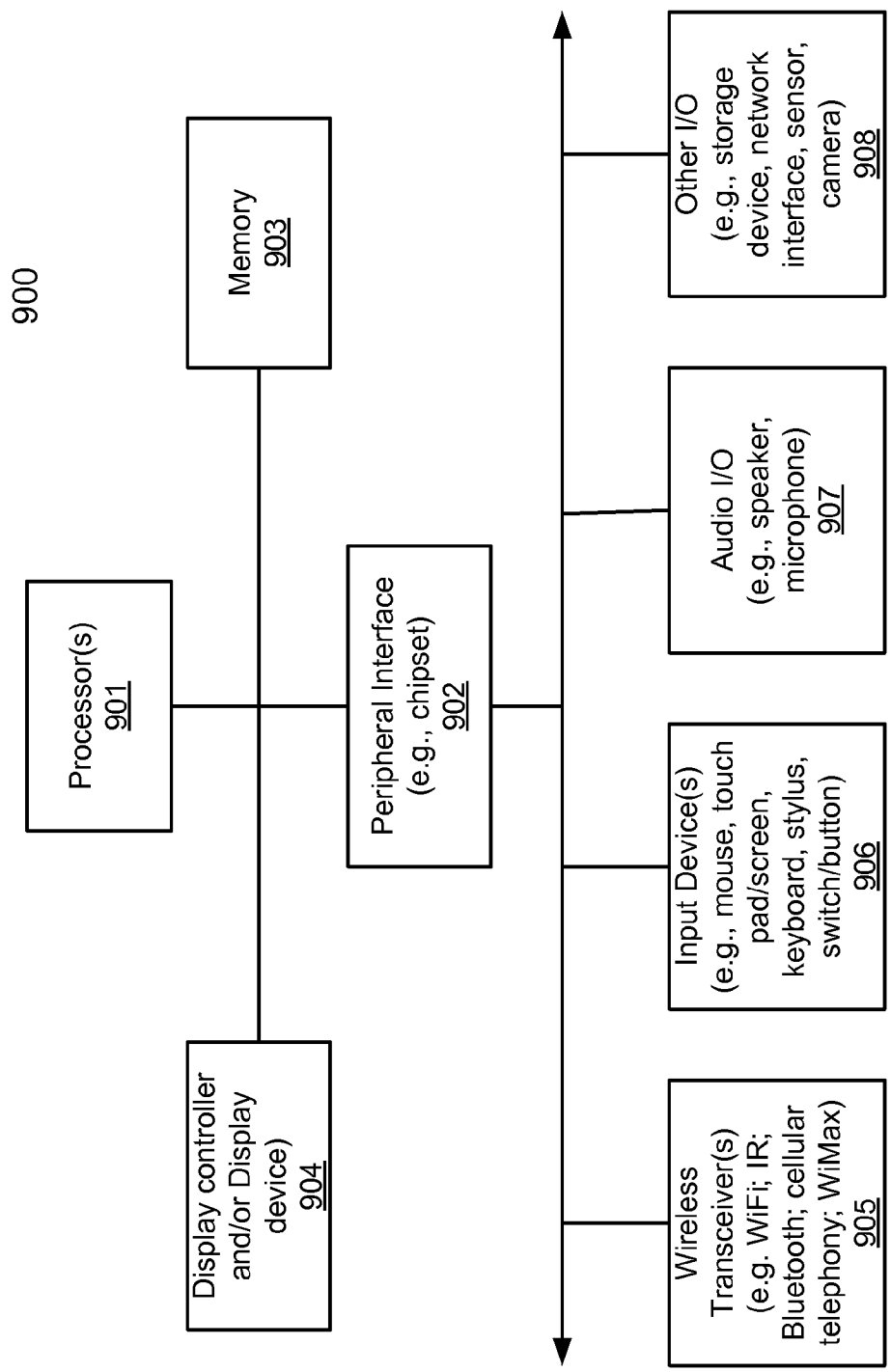
FIG. 7 is a block diagram illustrating an example of a data processing system which may be used with one embodiment of the invention.

FIG. 7 is a block diagram illustrating an example of a data processing system which may be used with one embodiment of the invention. For example, system 900 may represent any of data processing systems described above performing any of the processes or methods described above. System 900 may represent a desktop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 7, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting malicious content, the method comprising:

monitoring, by a monitoring module executed by a processor, activities behaviors of a malicious content suspect executed within a sandboxed operating environment;

detecting, while monitoring, an event triggered by the malicious content suspect to display a graphical user interface (GUI) operating as a dialog box that prompts for user interaction;

in response to detecting the event to display the GUI triggered by the malicious content suspect, simulating, by a user interaction module executed by the processor, the user interaction with the GUI without user intervention; and analyzing, by an analysis module executed by the processor, behaviors of the malicious content suspect in response to the simulated user interaction to determine whether the malicious content suspect should be declared as malicious, wherein simulating the user interaction comprises automatically, without user intervention, sending a response representing an activation of a predetermined button of the dialog box for receipt by the malicious content suspect.

2. The method of claim 1, wherein the detecting the event comprises detecting a notification from an operating system that the malicious content suspect has initiated signaling to a GUI Application Programming Interface to display the dialog box.

3. The method of claim 1, wherein the predetermined button when activated is to dismiss the dialog box.

4. The method of claim 1, wherein the detecting of the event comprises intercepting a call by the malicious content suspect to an Application Programming Interface.

5. The method of claim 1, wherein the monitoring of the behaviors of the malicious content suspect comprises registering a hook to a GUI Application Programming Interface of an operating system.

6. The method of claim 5, wherein the detecting of the event comprises receiving a notification from the operating system of a communication from the malicious content suspect to the GUI Application Programming Interface to display the dialog box.

7. The method of claim 1, wherein prior to sending the response, the simulating of the user interaction further comprises (i) building an internal data structure that represents content and layout of the dialog box, (ii) comparing the internal data structure to a library of dialogs stored in memory, and (iii) upon matching one of the dialogs, obtaining information associated with a matched dialog to dismiss the dialog box.

8. The method of claim 1, wherein the analyzing of the behaviors of the malicious content suspect comprises analyzing information associated with the behaviors based on a set of rules to determine whether the malicious content suspect is considered to be malicious.

9. The method of claim 1, wherein the simulating of the user interaction with the GUI operating as the dialog box is conducted without displaying the dialog box.

10. A computer-implemented method for detecting malicious content, the method comprising:
monitoring, by a monitoring module executed by a processor, behaviors of a malicious content suspect executed within a sandboxed operating environment;
detecting, while monitoring, an event triggered by the malicious content suspect to display a graphical user interface (GUI) operating as a dialog box that prompt for user interaction;
in response to detecting the event to display the dialog box triggered by the malicious content suspect, simulating, by a user interaction module executed by the processor, the user interaction with the GUI without user intervention; and
analyzing, by an analysis module executed by the processor, behaviors of the malicious content suspect in response to the simulated user interaction to determine whether the malicious content suspect should be declared as malicious,
wherein simulating the user interaction comprises automatically, without user intervention, sending a command representing an activation of a predetermined button presented by the dialog box for receipt by the malicious content suspect, the command to represent execution or storage of an attached file.

11. The method of claim 10, further comprising monitoring activities of the malicious content suspect with respect to the attached file or execution of the attached file to determine whether the attached file is a malicious content related file.

12. A computer-implemented method for detecting malicious content, the method comprising:
monitoring, by a monitoring module executed by a processor, behaviors of a malicious content suspect executed within a sandboxed operating environment;
detecting, while monitoring, an event triggered by the malicious content suspect to display a graphical user interface (GUI) operating as a dialog box that prompt for user interaction;
in response to detecting the event to display the dialog box triggered by the malicious content suspect, simulating, by a user interaction module executed by the processor, the user interaction with the GUI without user intervention; and
analyzing, by an analysis module executed by the processor, behaviors of the malicious content suspect in response to the simulated user interaction to determine whether the malicious content suspect should be declared as malicious,
wherein simulating the user interaction comprises intercepting a system call received from the malicious content suspect to an operating system for displaying the GUI, and returning a return code to the malicious content suspect without sending the system call to the operating system, the return code indicating a user action representing a CLOSE command to prevent the GUI from being displayed.

13. A computer-implemented method for detecting malicious content, the method comprising:
monitoring, by a monitoring module executed by a processor, behaviors of a malicious content suspect executed within a sandboxed operating environment;
detecting, while monitoring, an event triggered by the malicious content suspect to display a graphical user interface (GUI) operating as a dialog box that prompt for user interaction;
in response to detecting the event to display the dialog box triggered by the malicious content suspect, simulating, by a user interaction module executed by the processor, the user interaction with the GUI without user intervention; and
analyzing, by an analysis module executed by the processor, behaviors of the malicious content suspect in response to the simulated user interaction to determine whether the malicious content suspect should be declared as malicious,
wherein simulating the user interaction comprises intercepting a system call received from the malicious content suspect to an operating system for displaying the GUI, forwarding the system call to the operating system to display the GUI, transmitting, without user intervention, a command to the operating system simulating a user activation of a CLOSE button of the GUI to terminating the GUI, and returning a return code received from the operating system to the malicious content suspect, the return code representing a status of executing the simulated CLOSE command by the operating system.

14. A computer-implemented method for detecting malicious content, the method comprising:
monitoring, by a monitoring module executed by a processor, behaviors of a malicious content suspect executed within a sandboxed operating environment;
detecting, while monitoring, an event triggered by the malicious content suspect to display a graphical user interface (GUI) operating as a dialog box that prompt for user interaction;
in response to detecting the event to display the dialog box triggered by the malicious content suspect, simulating, by a user interaction module executed by the processor, the user interaction with the GUI without user intervention; and
analyzing, by an analysis module executed by the processor, behaviors of the malicious content suspect in response to the simulated user interaction to determine whether the malicious content suspect should be declared as malicious,
wherein simulating the user interaction comprises intercepting a system call received from the malicious content suspect to an operating system for displaying the GUI, the GUI prompting a user to select a file for access, (ii) automatically, without user intervention, selecting a file based on a type of the file being requested based on the system call, and (iii) populating and returning a returning structure of selecting the file without sending the system call to the operating system.

15. A computer-implemented method for detecting malicious content, the method comprising:
monitoring, by a monitoring module executed by a processor, behaviors of a malicious content suspect executed within a sandboxed operating environment;
detecting, while monitoring, an event triggered by the malicious content suspect to display a graphical user interface (GUI) operating as a dialog box that prompt for user interaction;
in response to detecting the event to display the dialog box triggered by the malicious content suspect, simulating, by a user interaction module executed by the processor, the user interaction with the GUI without user intervention; and
analyzing, by an analysis module executed by the processor, behaviors of the malicious content suspect in response to the simulated user interaction to determine whether the malicious content suspect should be declared as malicious,
wherein simulating the user interaction comprises invoking an automated scripting environment to simulate user interaction on the GUI.

16. The method of claim 15, wherein the monitoring of the behaviors of the malicious content comprises executing the malicious content suspect within the automated scripting environment and, upon detecting the request, the monitoring module provides executable instructions to the user interaction module.

17. The method of claim 16, wherein the simulating of the user interaction comprises processing the executable instructions by the user interaction module and, during the processing of the executable instructions, a command is provided to the automated scripting environment so as to simulate the user interaction.

18. The method of claim 15, wherein the detecting of the event comprises providing a script to the user interaction module.

19. The method of claim 15, wherein the simulating of the user interaction comprises executing one or more instructions to return a command to the malicious content suspect to simulate the user interaction.

20. A non-transitory machine-readable medium having instructions stored therein, which when executed by a processor, cause the processor to perform operations comprising:
monitoring behaviors of a malicious content suspect executed within a sandboxed operating environment;
detecting, while monitoring, an event triggered by the malicious content suspect to display a graphical user interface (GUI) operating as a dialog box that prompts for user interaction;
in response to detecting the event to display the GUI triggered by the malicious content suspect, simulating the user interaction with the GUI without user intervention; and
analyzing behaviors of the malicious content suspect in response to the simulated user interaction to determine whether the malicious content suspect should be declared as malicious,
wherein simulating the user interaction comprises automatically, without user intervention, sending a response representing an activation of a predetermined button of the dialog box for receipt by the malicious content suspect.

21. The medium of claim 20, wherein the detecting the request comprises detecting a notification from an operating system that the malicious content suspect has initiated signaling to a GUI Application Programming Interface to display the dialog box.

22. The medium of claim 20, wherein the predetermined button when activated is to dismiss the dialog box.

23. The medium of claim 20, wherein the detecting of the event, conducted in response to execution of the stored instructions by the processor, comprises intercepting a call initiated by the malicious content suspect to an Application Programming Interface.

24. The medium of claim 20, wherein the monitoring of the behaviors of the malicious content suspect, conducted in response to execution of the stored instructions by the processor, comprises registering a hook to a GUI Application Programming Interface of an operating system.

25. The medium of claim 24, wherein the detecting of the event comprises receiving a notification from the operating system of a communication initiated by the malicious content suspect to the GUI Application Programming Interface to display the dialog box.

26. The medium of claim 20, wherein prior to sending the response, the simulating of the user interaction, conducted in response to execution of the stored instructions by the processor, further comprises (i) building an internal data structure that represents content and layout of the dialog box, (ii) comparing the internal data structure to a library of dialogs stored in memory, and (iii) upon matching one of the dialogs, obtaining information associated with a matched dialog to dismiss the dialog box.

27. The medium of claim 20, wherein the analyzing of the behaviors of the malicious content suspect, conducted in response to execution of the stored instructions by the processor, comprises analyzing information associated with the behaviors based on a set of rules to determine whether the malicious content suspect is considered to be malicious.

28. The medium of claim 20, wherein the simulating of the user interaction with the GUI operating as the dialog box is conducted without displaying the dialog box.

29. A non-transitory machine-readable medium having instructions stored therein, which when executed by a processor, cause the processor to perform operations comprising:
monitoring behaviors of a malicious content suspect executed within a sandboxed operating environment;
detecting, while monitoring, an event triggered by the malicious content suspect to display a graphical user interface (GUI) operating as a dialog box that prompts for user interaction;
in response to detecting the event to display the GUI triggered by the malicious content suspect, simulating the user interaction with the GUI without user intervention; and
analyzing behaviors of the malicious content suspect in response to the simulated user interaction to determine whether the malicious content suspect should be declared as malicious,
wherein simulating the user interaction comprises automatically, without user intervention, sending a command representing an activation of a predetermined button presented by the GUI for receipt by the malicious content suspect, the commend to represent execution or storage of an attached file.

30. The medium of claim 29, wherein the processor performs further operations comprising monitoring activities of the malicious content suspect with respect to the attached file or execution of the attached file to determine whether the attached file is a malicious content related file.

31. A non-transitory machine-readable medium having instructions stored therein, which when executed by a processor, cause the processor to perform operations comprising:
monitoring behaviors of a malicious content suspect executed within a sandboxed operating environment;
detecting, while monitoring, an event triggered by the malicious content suspect to display a graphical user interface (GUI) operating as a dialog box that prompts for user interaction;
in response to detecting the event to display the GUI triggered by the malicious content suspect, simulating the user interaction with the GUI without user intervention; and
analyzing behaviors of the malicious content suspect in response to the simulated user interaction to determine whether the malicious content suspect should be declared as malicious,
wherein simulating the user interaction comprises intercepting a system call received from the malicious content suspect to an operating system for displaying the GUI, and returning a return code to the malicious content suspect without sending the system call to the operating system, the return code indicating a user action representing a CLOSE command to prevent the GUI from being displayed.

32. A non-transitory machine-readable medium having instructions stored therein, which when executed by a processor, cause the processor to perform operations comprising:
monitoring behaviors of a malicious content suspect executed within a sandboxed operating environment;
detecting, while monitoring, an event triggered by the malicious content suspect to display a graphical user interface (GUI) operating as a dialog box that prompts for user interaction;
in response to detecting the event to display the GUI triggered by the malicious content suspect, simulating the user interaction with the GUI without user intervention; and
analyzing behaviors of the malicious content suspect in response to the simulated user interaction to determine whether the malicious content suspect should be declared as malicious,
wherein simulating the user interaction comprises intercepting a system call received from the malicious content suspect to an operating system for displaying the GUI, forwarding the system call to the operating system to display the GUI, transmitting without user intervention a command to the operating system simulating a user activation of a CLOSE button of the GUI to terminating the GUI, and returning a return code received from the operating system to the malicious content suspect, the return code representing a status of executing the simulated CLOSE command by the operating system.

33. A non-transitory machine-readable medium having instructions stored therein, which when executed by a processor, cause the processor to perform operations comprising:
monitoring behaviors of a malicious content suspect executed within a sandboxed operating environment;
detecting, while monitoring, an event triggered by the malicious content suspect to display a graphical user interface (GUI) operating as a dialog box that prompts for user interaction;
in response to detecting the event to display the GUI triggered by the malicious content suspect, simulating the user interaction with the GUI without user intervention; and
analyzing behaviors of the malicious content suspect in response to the simulated user interaction to determine whether the malicious content suspect should be declared as malicious,
wherein simulating the user interaction comprises intercepting a system call received from the malicious content suspect to an operating system for displaying the GUI, the GUI prompting a user to select a file for access, automatically, without user intervention, selecting a file based on a type of the file being requested based on the system call, and populating and returning a returning structure of selecting the file without sending the system call to the operating system.

34. A non-transitory machine-readable medium having instructions stored therein, which when executed by a processor, cause the processor to perform operations comprising:
monitoring behaviors of a malicious content suspect executed within a sandboxed operating environment;
detecting, while monitoring, an event triggered by the malicious content suspect to display a graphical user interface (GUI) operating as a dialog box that prompts for user interaction;
in response to detecting the event to display the GUI triggered by the malicious content suspect, simulating the user interaction with the GUI without user intervention; and
analyzing behaviors of the malicious content suspect in response to the simulated user interaction to determine whether the malicious content suspect should be declared as malicious,
wherein simulating the user interaction comprises invoking an automated scripting environment to simulate user interactions on the GUI.

35. A malicious content detection system, comprising:
a processor; and
a memory coupled to the processor, the memory to store
a monitoring module that, when executed by the processor, (i) monitors behaviors of a malicious content suspect executed within a sandboxed operating environment and (ii) detects, while monitoring, an event triggered by the malicious content suspect to display a graphical user interface (GUI) operating as a dialog box that prompts for user interaction,
a user interaction module in communication with the monitoring module that, when executed by the processor and in response to detecting the event to display the GUI triggered by the malicious content suspect, simulates the user interaction with the GUI without user intervention by automatically, without user intervention, sending a response representing an activation of a predetermined button of the dialog box for receipt by the malicious content suspect, and
an analysis module to analyze behaviors of the malicious content suspect in response to the simulated user interaction to determine whether the malicious content suspect should be declared as malicious.

36. The system of claim 35, wherein the predetermined button when activated is to dismiss the dialog box.

37. The system of claim 35, wherein detecting of the event by the monitoring module comprises intercepting a call initiated by the malicious content suspect to an Application Programming Interface.

38. The system of claim 35, wherein monitoring of the behaviors of the malicious content suspect by the monitoring modules comprises registering a hook to a GUI Application Programming Interface of an operating system.

39. The system of claim 38, wherein detecting of the event by the monitoring module comprises receiving a notification from the operating system of a communication from the malicious content suspect to the GUI Application Programming Interface to display the dialog box.

40. The system of claim 35, wherein prior to sending the response, the user interaction module, when executed by the processor, further (i) builds an internal data structure that represents content and layout of the dialog box, (ii) compares the internal data structure to a library of dialogs stored in memory, and (iii) upon matching one of the dialogs, obtains information associated with a matched dialog to dismiss the dialog box.

41. The system of claim 35, wherein the analysis module, when executed by the processor, analyzes the behaviors of the malicious content suspect by at least analyzing information associated with the behaviors based on a set of rules to determine whether the malicious content suspect is considered to be malicious.

42. The system of claim 35, wherein the simulating of the user interaction with the GUI operating as the dialog box is conducted without displaying the dialog box.

43. A malicious content detection system comprising:

a processor; and a memory coupled to the processor, the memory to store a monitoring module that, when executed by the processor, (i) monitors behaviors of a malicious content suspect executed within a sandboxed operating environment and (ii) detects, while monitoring, an event triggered by the malicious content suspect to display a graphical user interface (GUI) operating as a dialog box that prompts for user interaction, a user interaction module in communication with the monitoring module that, when executed by the processor and in response to detecting the event to display the GUI triggered by the malicious content suspect, simulates the user interaction with the GUI without user intervention by automatically, without user intervention, sending a response representing an activation of a predetermined button of dialog box for receipt by the malicious content suspect, and an analysis module to analyze behaviors of the malicious content suspect in response to the simulated user interaction to determine whether the malicious content suspect should be declared as malicious, wherein the user interaction module is configured to automatically, without user intervention, send a command representing an activation of a predetermined button presented by the GUI for receipt by the malicious content suspect, the command to represent to conduct an execution or a storage of an attached file.

44. The system of claim 43, wherein the monitoring module is further configured to monitor activities of the malicious content suspect with respect to the attached file or execution of the attached file to determine whether the attached file is a malicious content related file.

* * * * *